(12) United States Patent
Karlsson et al.

(10) Patent No.: US 10,898,840 B2
(45) Date of Patent: Jan. 26, 2021

(54) FILTER ELEMENT COMPRISING INCLINED END PANELS AND RESPECTIVE FILTER HOUSING

(71) Applicant: VOLVO TRUCK CORPORATION, Gothenburg (SE)

(72) Inventors: Sebastian Karlsson, Gothenburg (SE); Jesper Blomstrand, Härryda (SE); Hans Rönnings, Gothenburg (SE); Claes Frennfelt, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 207 days.

(21) Appl. No.: 15/777,783

(22) PCT Filed: Dec. 17, 2015

(86) PCT No.: PCT/EP2015/080289
§ 371 (c)(1),
(2) Date: May 21, 2018

(87) PCT Pub. No.: WO2017/102009
PCT Pub. Date: Jun. 22, 2017

(65) Prior Publication Data
US 2018/0339253 A1    Nov. 29, 2018

(51) Int. Cl.
*B01D 46/00* (2006.01)
*B01D 46/24* (2006.01)

(52) U.S. Cl.
CPC ....... *B01D 46/0005* (2013.01); *B01D 46/009* (2013.01); *B01D 46/2414* (2013.01);
(Continued)

(58) Field of Classification Search
CPC ............ B01D 46/2411; B01D 46/2414; B01D 46/0005; B01D 2265/021; B01D 2265/026; B01D 2275/206; B01D 46/009
See application file for complete search history.

(56) References Cited

U.S. PATENT DOCUMENTS

| 7,074,250 B1 | 7/2006 | Chipner et al. |
| 2010/0186353 A1 | 7/2010 | Akcermann et al. |

(Continued)

FOREIGN PATENT DOCUMENTS

| DE | 102008063720 A1 | 6/2010 |
| DE | 102011083657 A1 | 3/2013 |

(Continued)

OTHER PUBLICATIONS

International Search Report (dated Sep. 30, 2016) for corresponding International App. PCT/EP2015/080289.

*Primary Examiner* — Robert Clemente
(74) *Attorney, Agent, or Firm* — Withrow & Terranova, P.L.L.C.

(57) ABSTRACT

A filter element is provided for being removably arranged in a filter housing. The filter element includes a tubular filter material body, and a first end panel at a first end of the filter element in an axial direction of the filter element. The first end panel includes an opening to an interior of the filter material body. The first end panel includes a generally flat external surface, which is inclined in relation to a plane perpendicular to the axial direction of the filter element. A filter housing including a compartment for receiving such a filter element is also provided. A filter system including such a filter element and filter housing, and an internal combustion engine system and a vehicle including such a filter system are also provided.

25 Claims, 5 Drawing Sheets

(52) U.S. Cl.
CPC .. *B01D 2265/021* (2013.01); *B01D 2265/026* (2013.01); *B01D 2275/206* (2013.01)

(56) References Cited

U.S. PATENT DOCUMENTS

| | | |
|---|---|---|
| 2010/0263338 A1 | 10/2010 | Bannister et al. |
| 2012/0067014 A1 | 3/2012 | Dhiman et al. |

FOREIGN PATENT DOCUMENTS

| | | |
|---|---|---|
| DE | 102014016908 A1 | 5/2015 |
| EP | 1839723 A1 | 10/2007 |
| EP | 2176097 B1 | 3/2018 |
| WO | 2007054168 A1 | 5/2007 |
| WO | 2011154412 A1 | 12/2011 |
| WO | 2013102888 A1 | 7/2013 |

FILTER ELEMENT COMPRISING INCLINED END PANELS AND RESPECTIVE FILTER HOUSING

BACKGROUND AND SUMMARY

The present disclosure relates to a filter element for being removably arranged in a filter housing. This filter element comprises a tubular filter material body and a first end panel at a first end of the filter element in an axial direction of the filter element, which first end panel comprises an opening to an interior of the filter material body. The present disclosure also relates to a filter housing comprising a compartment for receiving such a filter element. The present disclosure further relates to a filter system comprising such a filter element and filter housing. An internal combustion engine system and a vehicle comprising such a filter system are also disclosed. More specifically, the filter element is adapted for cleaning a fluid for the internal combustion engine, wherein the fluid may be a gas such as air or a liquid such as a lubricating oil or fuel. Such filter arrangements may be provided onboard vehicles and in other applications containing transport systems to remove unwanted solids or other contaminants from the fluid. The filter element may alternatively be called filter cartridge, filter module or filter insert.

It is well known that an internal combustion engine requires clean air to be used in the combustion process. It is further well known that the air to be used in the combustion process is cleaned through filtering through an air filter and that the air filter is replaced on a regular basis to keep the function at the desired level. Air filters that are replaced through axial displacement may need a large free volume in the movement direction in the internal combustion engine. A problem is however that free space is scarce and packaging of the engine is a challenging task in itself. One option is to instead use filter housings with filters arranged to be mounted substantially through a movement in the transversal direction. However, known solutions may suffer from challenging exchangeability and difficulties in mounting the filters correctly. An incorrectly mounted filter may suffer from insufficient sealing, which may lead to poor filtering of the passing air. This may in turn result to premature wear of the parts receiving the poorly filtered air. Similar reasoning is also valid for other types of filters adapted for filtering of other types of fluids, such as oil and fuel, but which otherwise have a similar design and use. It may be noted that an air filter has a substantially larger dimension than an oil filter or fuel filter.

A document disclosing an air filter and filter insert which is arranged to be mounted in the transversal direction in its housing is EP 1 839 723 A1. The abstract describes an air filter comprising a filter housing having a moving or removable housing part for releasing an upper-lateral maintenance opening. It is further described that the filter is inserted diagonally by first moving its front end against the pure air opening connection piece in the housing, followed by the end of the filter being swivelled downwards to an installation position. Proper connection of this air filter in its housing hence includes a series of steps in combination with a need to position the air filter in a proper rotational direction for proper cooperation between the fastening means in the filter housing with the air filter itself.

It is desirable to at least to some extent alleviate the shortcomings discussed above in relation to known filters, and to improve a filter element, especially for exchangeability and handling ease without compromising sufficient sealing.

According to a first aspect of the present disclosure a filter element comprises a tubular filter material body and a first end panel at a first end of the filter element in an axial direction of the filter element. The first end panel comprises an opening to an interior of the filter material body. The first end panel further comprises a generally flat external surface, which is inclined in relation to a plane perpendicular to the axial direction of the filter element. By having a filter element of this kind several advantageous effects are achieved. A positive effect is the improved easiness by which the filter is inserted. The inclined external surface of the filter element enables an insertion of the filter element generally straight down in the transversal direction, during which the inclined external surface of the filter element will provide for a wedging of the filter element. Furthermore this feature has the positive effect of providing for an inherent guiding as to how the filter should be correctly inserted, as well as providing for a rotational restriction of the filter element in its operational position. The inclined surface hence provides a tactile feedback to the operator in the assembly of the filter element. All of this simplifies the mounting of the filter element, which in combination with the proper mounting direction secures sealing of the filter element to the filter housing. Tactile feedback is also advantageous if and when the visibility is poor, either through location within its surrounding, or through poor lightning conditions.

According to an embodiment the periphery of the first end panel in the axial direction defines a plane, which is inclined in relation to a plane perpendicular to the axial direction of the filter element. Thus, the generally flat external surface encompasses substantially the complete first end panel, and thus also the opening. This has a positive effect in that it provides an improved sealing around the opening against the filter housing. This is achieved by the inclination of the generally flat external surface that encompasses the opening which enables a sealing engagement of the filter element against the filter housing having a correspondingly inclined surface. The sealing engagement is further reinforced by the wedging effect achieved when inserting the filter element into its operational position. Furthermore the filter element provides an easy manufacturing process which provides for low manufacturing costs. This is achieved through a simple construction of the filter element, in which a common structure that is integral with the first end panel of the filter element provides for a sealing effect as well as a wedging effect of the filter element against the filter housing.

According to an embodiment the inclination in relation to the plane perpendicular to the axial direction of the filter element corresponds to an angle α preferably 1° to 10°, more preferably 1° to 5°, and most preferably 1° to 3°. This provides for an improved sealing as well as wedging effect of the filter element against the filter housing.

According to an embodiment the flat external surface substantially encompasses the opening. Hereby an improved sealing engagement around the opening is achieved.

According to an embodiment the opening is located coaxial to the filter element. This enables for an effective air flow through the filter material body and clean fluid out through the opening. It further provides an easy manufacturing process and low manufacturing costs.

According to an embodiment the filter element comprises a second end panel opposite the first end panel in the axial direction, wherein the second end panel comprises a generally flat external surface, which is inclined in relation to a plane perpendicular to the axial direction of the filter element. Having inclined external surfaces on both end panels of the filter further improves the easiness by which the filter is inserted since the correct orientation of filter that enables the insertion becomes even more pronounced. A correct orientation or alignment of the filter when inserted is important for achieving a sufficient sealing around the opening. The inherent guiding applied by the inclined external surfaces also becomes more pronounced, which improves the wedging effect as well as the rotational restriction of the filter when in its operational position.

According: to an embodiment the periphery of the second end panel in the axial direction defines a plane, which is inclined in relation to a plane perpendicular to the axial direction of the filter element. This provides for an improved easiness by which the filter is inserted. This provides for an improved wedging as well as sealing effect of the filter insert against the filter housing.

According to an embodiment the inclination in relation to the plane perpendicular to the axial direction of the filter element corresponds to an angle β for the second end panel preferably 1° to 10°, more preferably 1° to 5°, and most preferably 1° to 3°. This provides for an improved wedging as well as sealing effect of the filler element against the filter housing.

According to an embodiment the angle β for the second end panel is equal to the angle α for the first end panel. This provides for an easy manufacturing process and low manufacturing costs. It also provides for an easy orientation of the filter for correct insertion to achieve sufficient sealing.

According to an embodiment the external surface of the second end panel is oppositely inclined as seen in relation to the external surface of the first end panel. Having oppositely inclined external surfaces on both end panels of the filter further improves the easiness by which the filter is inserted since the correct orientation of filter that enables the insertion becomes even more pronounced. A correct orientation and alignment of the filter when inserted is important for achieving a sufficient sealing around the opening. The inherent guiding applied by the oppositely inclined external surfaces also becomes more pronounced which improves the wedging effect as well as the rotational restriction of the filter which is achieved during insertion and when in its operational position. A further positive effect is an easy manufacturing process and low manufacturing costs.

According to an embodiment the first end panel and/or the second end panel is provided with a guiding structure for engagement with an inner surface of the filter housing for guiding the filter element to an operational position in the filter housing during insertion of the filter element into the filter housing. This guiding structure comes in addition to the guiding feature which is inherent in the inclined surface(s) as disclosed and discussed above. It has the positive effects that it provides easiness by which the filter element is inserted and in particular enables further inherent control that the filter element is inserted with the correct orientation and alignment.

According to an embodiment the guiding structure forms a tapered shape. This provides for an improved guiding and wedging effect of the filter element against the filter housing.

According to an embodiment the guiding structure is provided on the first end panel and partially or substantially encompasses the opening. This provides for an improved wedging as well as an improved sealing engagement around the opening of the filter element against the filter housing.

According to an embodiment the guiding structure of the first end panel and/or the second end panel is located coaxial to the filter element. This provides for an improved wedging as well as sealing engagement of the filter element against the filter housing.

According to an embodiment the guiding structure has a guiding direction, the guiding direction coinciding with a direction of inclination of the inclined surface of the associated end panel. A positive effect is that the guiding structure and the inclined external surfaces work together and improves the easiness of a correct insertion of the filter element.

According to an embodiment the first end panel and/or the second end panel is provided with a compressible material. This provides for an improved wedging and sealing effect of the filter element against the filter housing, due to the compressibility of the material.

According to an embodiment the first end panel and/or the second end panel comprising the guiding structure is made of a compressible material. This provides for an improved wedging and sealing effect of the filter element against the filter housing. Further it also provides a simple construction of the filter in which the end panels and guiding structures are formed in a common structure from the same material.

According to an embodiment the compressible material is a rubber, preferably a foam rubber. This provides for an improved wedging and sealing effect of the filter element against the filter housing.

According to an embodiment the first end panel and/or the second end panel comprises means for a sealing engagement with an inner surface of the filter housing. This provides improved sealing effect against the filter housing.

According to an embodiment the sealing means is formed integral with the external inclined surface of the first end panel and/or the second end panel. This provides a simple construction of the filter in which the end panels and sealing means are formed as a common structure.

According to an embodiment the external inclined surface of the first end panel and/or the second end panel is adapted for engaging a correspondingly inclined internal surface of the filter housing. A positive effect is the improved easiness by which the filter is inserted. The correspondingly inclined surface has the positive effect that it enables an insertion of the filter element straight down in the transversal direction, during which the matching inclined surfaces will provide for a wedging of the filter element. Furthermore this feature has the positive effect of providing for an inherent guiding as to how the filter should be correctly inserted, as well as providing for a rotational restriction of the filter element in its operational position. A further positive effect is also the improved sealing effect.

According to an embodiment the filter material body is made of a material chosen from the group of: paper and cellulose. This provides maintaining a sufficient filtration of the air while at the same time providing low manufacturing costs.

According to an embodiment the filter element has a tubular shape, preferably chosen from the group of circular, elliptic, oval and flower-shaped. This provides a shape that gives an as large filtering surface area as possible, given the tubular shape.

According to an embodiment the filter element is adapted for cleaning a fluid for an internal combustion engine. According to an embodiment the filter element is adapted for cleaning air.

According to a second aspect of the present disclosure a filter housing is disclosed. This filter housing comprises a compartment for receiving a filter element, a first end wall in an axial direction of the filter housing, which first end wall comprises an opening to the compartment. The first end wall further comprises a generally flat internal surface, which is inclined in relation to a plane perpendicular to the axial direction of the filter housing. When the filter is inserted the inclined surfaces will provide for a wedging of the filter element, which has the further positive effects of providing a sealing engagement between the opening of filter element and the opening of the filter housing, in addition to contributing to maintaining the filter element in the desired operational position. The concept of correspondingly inclined surfaces enables a simple and easy way to insert a filter element, correctly aligned, in straight-down fashion in a transversal direction, since the correspondingly inclined surfaces provide an inherent guiding to how the filter should be oriented for enabling insertion, as well as providing a wedging of the filter element against the filter housing.

According to an embodiment the filter housing comprises a housing lid for closing the compartment, wherein the housing lid has an abutment surface which is arranged to provide pressure on a filter element positioned in the compartment for generating a sealing force between an opening of the filter element and the opening of the filter housing when the housing lid is arranged to close the filter housing. A positive effect is that this arrangement will keep the filter element retained in the desired position, while at the same time providing a desired spacing between the lid and the long side of the filter element.

According to an embodiment the housing lid is arranged in an envelope surface of the filter housing, such that the housing lid forms a part of the filter housing when closed. This arrangement has a positive effect in that it is a space-saving solution, which improves the efficiency of e.g. engine room packaging.

According to an embodiment the housing lid is arranged to open the filter housing for a movement of the filter element to and from, respectively, the filter housing in a direction perpendicular to the axial direction of the filter housing. A positive effect is the improved easiness by which the filter is inserted in the filter housing. It further provides a space-saving solution for the engine room.

According to an embodiment the housing lid has an extension in the axial direction of the filter housing, which is as long as an extension of the filter element in its axial direction, or somewhat longer, for a movement of the filter element to and from, respectively, the filter housing in a position, in which its axial direction is generally in parallel with the axial direction of the filter housing. A positive effect is the improved easiness by which the filter is inserted in the filter housing.

According to an embodiment the filter housing having a tubular shape.

According to an embodiment the filter housing is adapted to receive a filter element according to any one of the embodiments which are disclosed above in the compartment, wherein the generally flat internal surface of the first end wall of the filter housing is correspondingly shaped to the generally flat external surface of the first end panel of the filter element. A positive effect with such a filter housing is that the correspondingly inclined surfaces enables an insertion of the filter element straight down in the transversal direction, during which the correspondingly inclined surfaces will provide for a wedging of the filter element. Furthermore this feature has the positive effect of providing for an inherent guiding as to how the filter should be correctly inserted, as well as providing for a rotational restriction of the filter element in its operational position. A positive effect is also the improved sealing effect around the opening of the filter element against the filter housing.

According to a third aspect of the present disclosure a filter system is disclosed. This filter system comprises a filter element according to any one of the embodiments which are disclosed above and a filter housing according to any one of the embodiments which are disclosed above. The filter system is provided such that the external inclined surface of the first end panel of the filter element is retained against the internal inclined surface of the first end wall of the filter housing when the filter element is installed in the filter housing. A positive effect of such a filter system is that the correspondingly inclined surfaces enables an insertion of the filter element straight down in the transversal direction, during which the matching inclined surfaces will provide for a wedging of the filter element. Furthermore this feature has the positive effect of providing for an inherent guiding as to how the filter should be correctly inserted, as well as providing for a rotational restriction of the filter element in its operational position. A positive effect is also the improved sealing effect around the opening of the filter element against the filter housing.

According to a fourth aspect of the present disclosure an internal combustion engine is disclosed which comprises a filter system according to an embodiment which is disclosed above.

According to a fifth aspect of the present disclosure a vehicle is disclosed which comprises an internal combustion engine according to an embodiment which disclosed above.

According to a sixth aspect of the present disclosure a filter element is disclosed. This filter element comprises a first end panel at a first end of the filter element in an axial direction of the filter element, which first end panel comprises a means for a sealing engagement with an inner surface of the filter housing. The first end panel further comprises a generally flat external surface, which is inclined in relation to a plane perpendicular to the axial direction of the filter element. By having a filter element of this kind several advantageous effects are achieved. A positive effect is the improved easiness by which the filter is inserted. The inclined external surface of the filter element has the positive effect that it enables an insertion of the filter element straight down in the transversal direction, during which the inclined external surface of the filter element will provide for a wedging of the filter element. Furthermore this feature has the positive effect of providing for an inherent guiding as to how the filter should be correctly inserted, as well as providing for a rotational restriction of the filter element in its operational position.

According to an embodiment the sealing means is formed integral with the external inclined surface of the first end panel. This provides a simple construction of the filter in which the end panel and sealing means are formed as a common structure.

According to an embodiment the inclination in relation to the plane perpendicular to the axial direction of the filter element corresponds to an angle α preferably 1° to 10°, more preferably 1° to 5°, and most preferably 1° to 3°. This provides for an improved wedging as well as sealing effect of the filter element against the filter housing.

According to a seventh aspect of the present disclosure a filter element is disclosed. This filter element comprises a first end panel at a first end of the filter element in an axial direction of the filter element and a second end panel at a second end of the filter element opposite the first end panel in the axial direction of the filter element. A substantial part of the first end panel and/or the second end panel has such an external shape that the filter element forms a wedge structure perpendicular to the axial direction of the filter element. This has the positive effect that it enables an easy insertion of the filter element straight down in the transversal direction and that will provide for a wedging of the filter element. Furthermore this feature has the positive effect of providing for an inherent guiding as to how the filter should be correctly inserted, as well as providing for, a rotational restriction of the filter element in its operational position.

According to an embodiment substantially the complete first end panel and/or the complete second end panel has such an external shape that the filter element forms a wedge structure perpendicular to the axial direction of the filter element. This has the positive effect that it enables an easy insertion of the filter element straight down in the transversal direction and that will provide for a wedging of the filter element. Furthermore this feature has the positive effect of providing for an inherent guiding as to how the filter should be correctly inserted, as well as providing for a rotational restriction of the filter element in its operational position.

According to an embodiment the first end panel and the second end panel are oppositely inclined with the same angle in relation to the axial direction of the filter element. Having oppositely inclined external surfaces on the end panels of the filter element improves the easiness by which the filter is inserted since the correct orientation of filter that enables the insertion becomes clearly pronounced. A correct orientation and alignment of the filter when inserted is important for achieving a sufficient sealing around the opening. The inherent guiding applied by the oppositely inclined external surfaces also becomes more pronounced which improves the wedging effect as well as the rotational restriction of the filter which is achieved during insertion and when in its operational position. A further positive effect is an easy manufacturing process and low manufacturing costs.

BRIEF DESCRIPTION OF THE DRAWINGS

With reference to the appended drawings, below follows a more detailed description of embodiments cited as non-limiting examples.

In the drawings.

DETAILED DESCRIPTION

Figure 1:
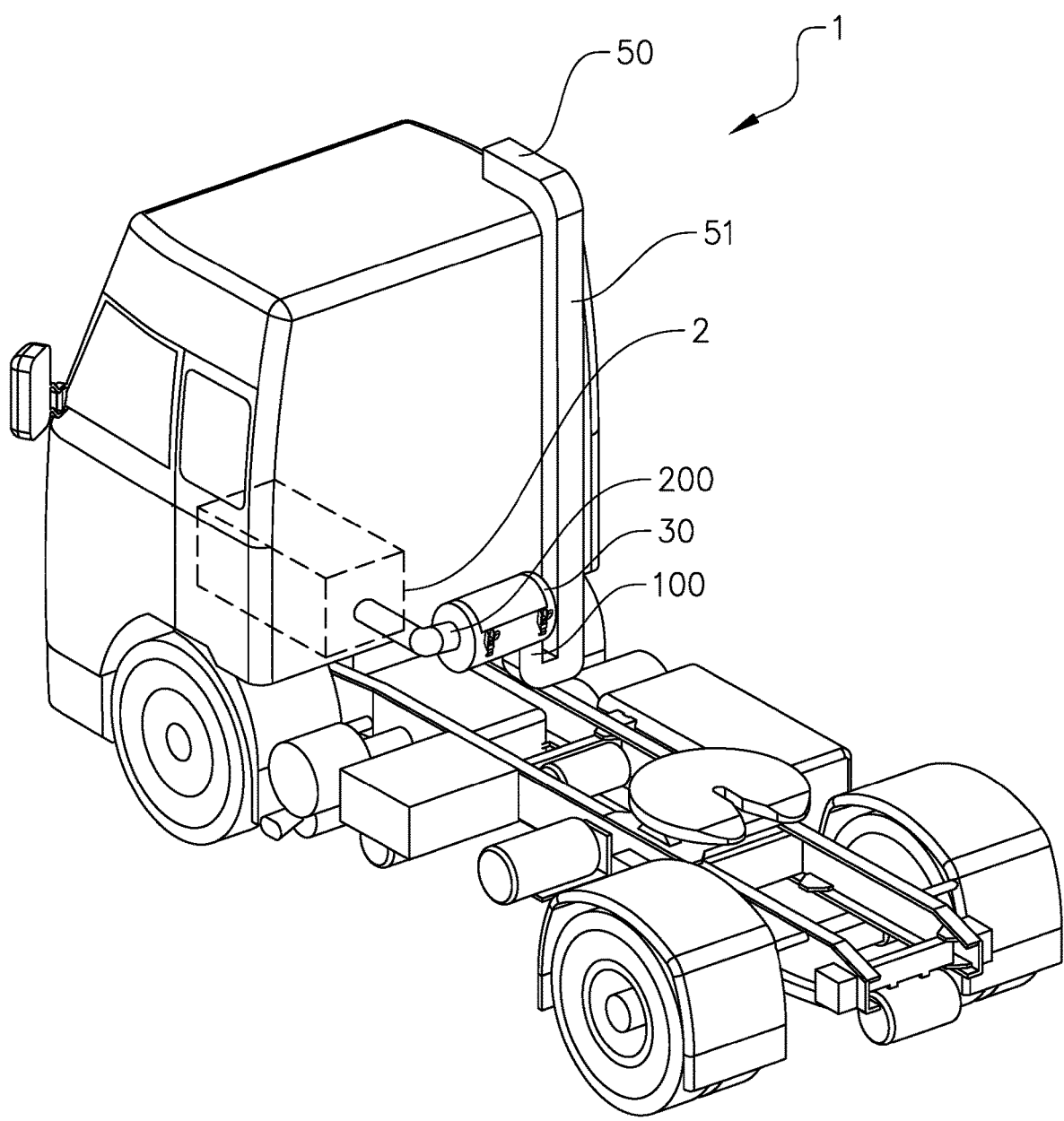
FIG. 1 is a view from behind of a vehicle carrying a filter housing and a filter element according to the present disclosure.

With reference to FIG. 1 a heavy duty truck vehicle 1 is disclosed comprising an internal combustion engine system 2 for which a filter system 40 comprising a filter element 5 of a kind disclosed in the present disclosure and a filter housing 30 of a kind disclosed in the present disclosure may be advantageous. However, the internal combustion engine system 2 may well be implemented also in other types of vehicles, such as in busses, in light-weight trucks, passenger cars, marine applications etc. The internal combustion engine system 2 may e.g. be a diesel engine, which as such may be running on several different types of fuel, such as diesel or dimethyl ether, DME. Other fuel types are well suited, as well as hybrid systems. The filter element 5 may be adapted for cleaning air. It may also be adapted for cleaning another fluid for an internal combustion engine system 2, or for other purposes in a vehicle 1 than for an internal combustion engine system 2. Such other fluids may include different types of oils. The internal combustion engine system 2 is provided with the air filter element 5 and the air filter housing 30 as disclosed herein.

The air filter element 5 of the kind disclosed herein is located downstream an air intake 50 which draws air from the ambient. The ambient air is most often in need of filtration before being directed towards an inlet of the internal combustion engine system 2. Downstream the air intake 50 an air pipe 51 directs the air to an inlet 100 of the air filter housing 30. Within the air filter housing 30 the air filter element 5 is located through which the air is filtered and further directed through an air outlet 200 and towards the internal combustion engine system 2. The air filter housing 30 is located in a lower region of the vehicle 1 and the air intake 50 in a higher region of the vehicle 1. In the depicted embodiment the air filter housing 30 is located directly behind a vehicle cab, whereas the air intake 50 is located on top of the vehicle cab at a rear end thereof. The air pipe 51 is located at the rear end in a generally vertical position of the vehicle cab. The air filter housing 30 is located having its axial direction transversal to the driving direction of the vehicle 1. The locations of the parts detailed above may well be otherwise.

Figure 2A:
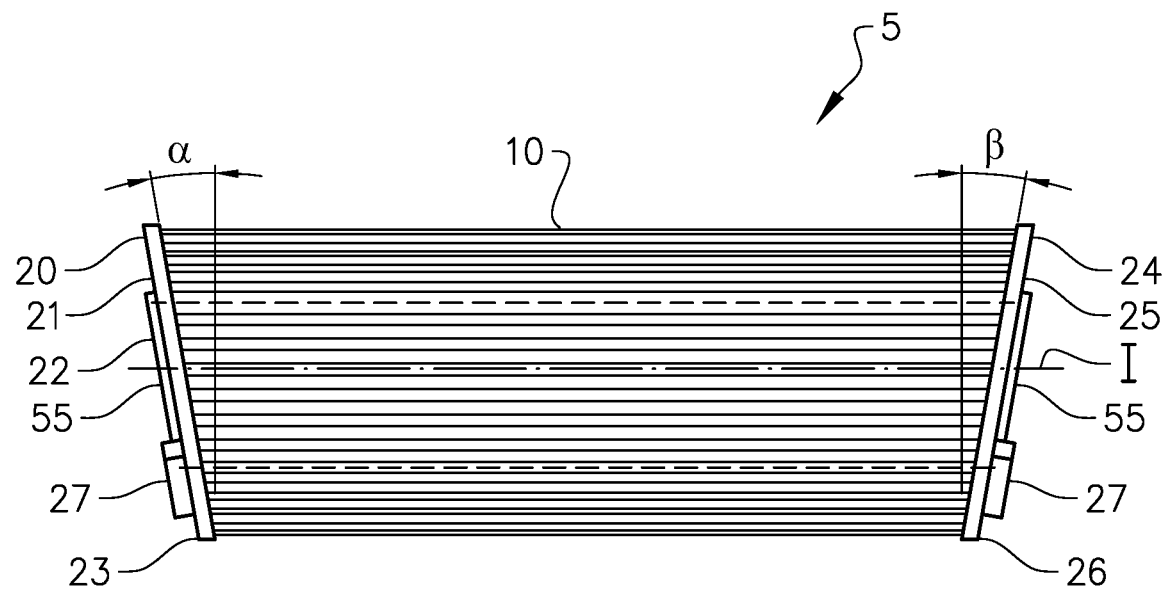
FIG. 2a is a side view of a first embodiment of a filter element according to the present disclosure.
Figure 2B:
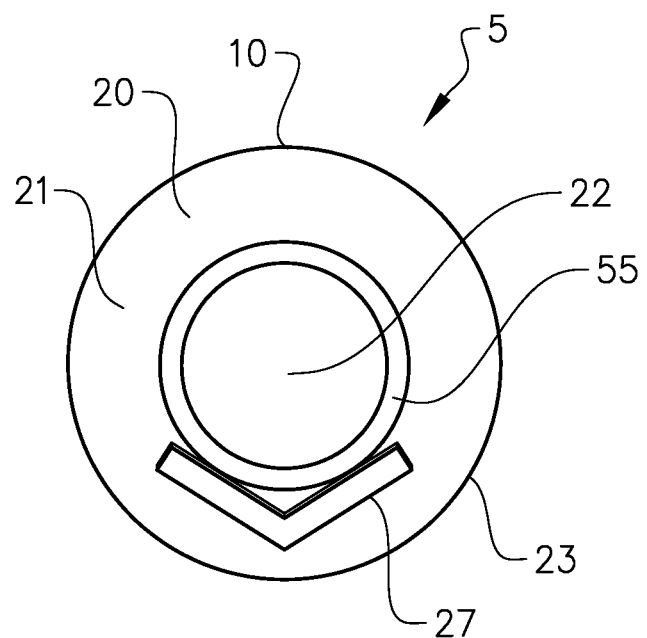
FIG. 2b is an end view of the filter element in FIG. 2a, FIG. 3 is a side view of the first embodiment of a filter housing and the filter element in FIGS. 2a and 2b during mounting.

Initially a description of a first embodiment of the present disclosure will be provided based on FIGS. 2a and 2b. The reference numeral 5 is dedicated to a filter element and refers to the whole design as shown in FIG. 2a. The air filter element 5 of the present disclosure is adapted for being removably arranged in the air filter housing 30. Examples of this arrangement are disclosed in FIGS. 3, 4 and 7, which will be described in more detail further down. The filter element 5 according to this embodiment may be used also in other applications than the automotive use disclosed in relation to FIG. 1, and for types of fluids other than air, such as fuel and oil, although with a substantially smaller dimension.

The air filter element 5 comprises a tubular filter material body 10 made of any material that is suited for the filtering operation of the fluid to be filtered. The air filter element 5 has in the disclosed embodiment an even thickness and a cylindrical shape in cross-section. More specifically, the air filter element 5 has in the disclosed embodiment a circular shape in cross-section. The air filter element 5 has a corrugated or pleated surface and the filter material body 10 is made of paper. The filter material body 10 could also be made of cellulose.

The air filter element 5 comprises a first end panel 20 and a second end panel 24, which is located opposite to the first end panel 20 in relation to the filter material body 10. The first end panel 20 and the second end panel 24 cover the parts of the axial ends which are next to the filter material body 10 and leaves the opening 22 open. The first end panel 20 and the second end panel 24 are made of a sheet metal or other planar material. In the depicted embodiment the first end panel 20 and the second end panel 24 are generally completely flat and located at an angle to a plane perpendicular to the axial direction I of the filter element 5. The first end panel 20 has an angle α to said direction, and the second end panel 24 has an angle β to said direction. In the depicted embodiment α equals β, but this may be otherwise. The external surface 25 of the second end panel 24 is oppositely inclined as seen in relation to the external surface 21 of the first end panel 20. This means that the inclination of the external surface 21 of the first end panel 20 is directed towards the inclination of the external surface 25 of the second end panel 24. A length between the first end panel 20 and the second end panel 24 along the outer envelope surface of the filter element 5 is shortest on the vertically seen bottom part of the filter element 5, and is longest on the vertically seen upper part of the filter element 5, as seen in FIG. 2a. The shortest side corresponds to the side which is directed towards the filter housing 30 when being installed therein.

The first end panel 20 comprises the opening 22 to an interior of the filter material body 10, through which opening 22 the filtered, or to-be filtered, air can either leave or enter the air filter element 5. The opening 22 is in FIGS. 2a and 2b located centrically in relation to the centre of the air filter element 5 in an axial direction I. The opening 22 is communicating with the interior of the air filter element 5, and the interior of the air filter element 5 is preferably, but not necessarily of the same size and shape as the opening 22. The interior is reaching into the air filter element 5, and preferably reaching all the way through the air filter element 5 to the second end panel 24. The interior may however reach a shorter distance into the air filter element 5 as seen in the axial direction I. The dashed lines in FIG. 2a indicate this.

Figure 3:
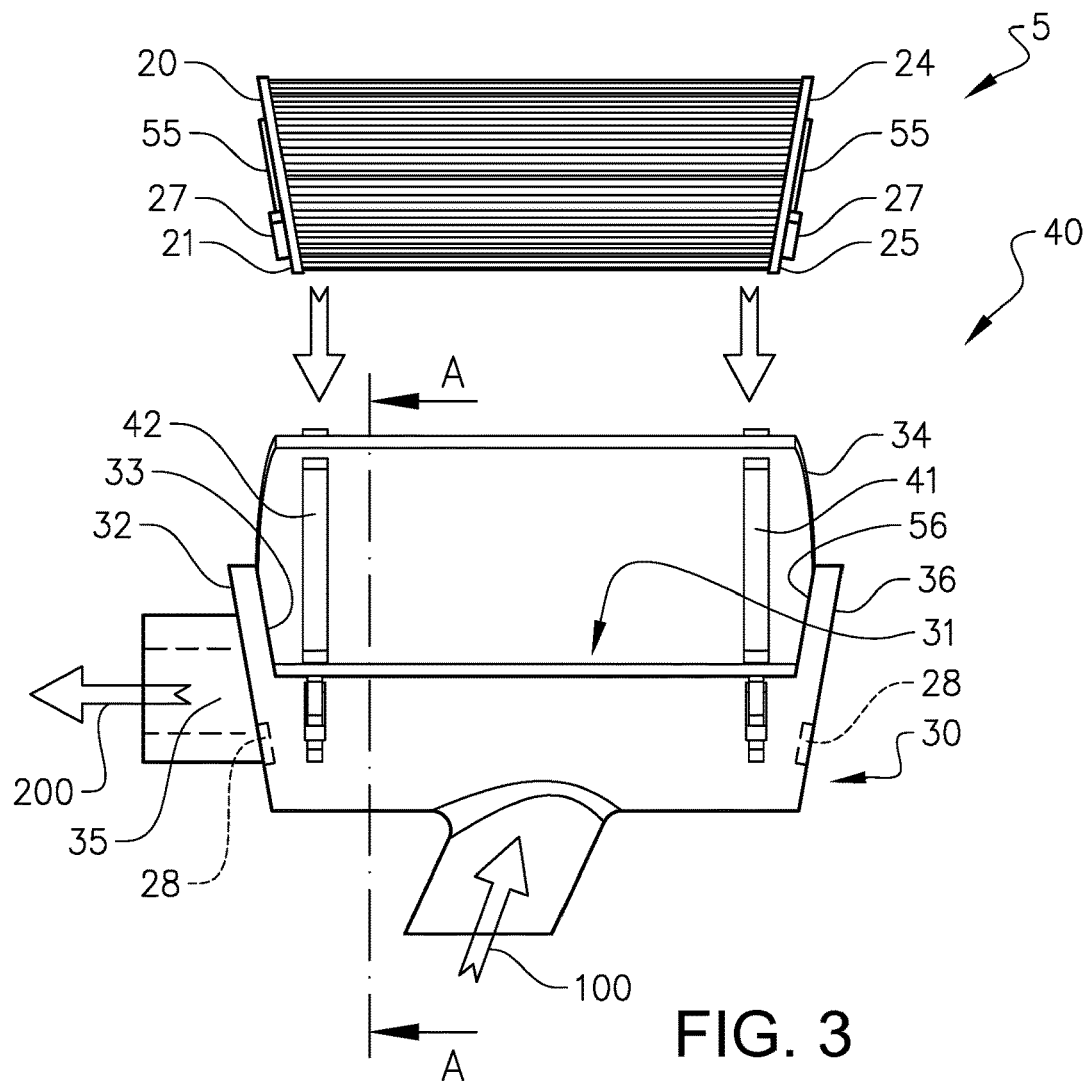
Figure 4:
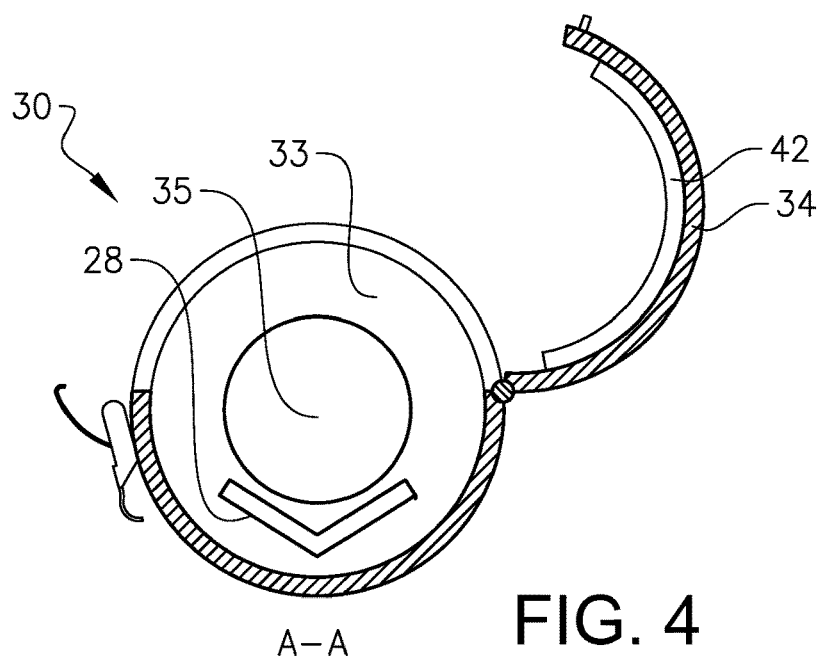
FIG. 4 is a cross-section at A-A of the filter housing in FIG. 3.

With reference to FIGS. 3 and 4 an air filter system 40 comprising the air filter element 5 and the air filter housing 30 will be described in more detail. The air filter element 5 is in both of these figures the same embodiment as disclosed in relation to FIGS. 2a and 2b.

In FIG. 3 the air filter housing 30 is disclosed comprising a compartment 31 for receiving the air filter element 5, the fluid inlet 100 and the fluid outlet 200. The air filter housing 30 is depicted having a circular tubular shape. The shape is made such that it generally corresponds to the shape of the air filter element 5. The air filter housing 30 further comprises a first end wall 32, which comprises a generally flat internal surface 33, which is inclined in relation to a plane perpendicular to an axial direction of the air filter housing 30. Furthermore the first end wall 32 comprises an opening 35 to the compartment 31 which is partially encompassed by a guiding structure 28 with a tapered shape. The opening 35 is the entrance to the outlet 200 of the air filter housing 30. The opening 35 has a size, shape and position in relation to the air filter housing 30 such that it corresponds to the size, shape and position of the opening 22 of the air filter element 5.

The air filter housing 30 further comprises a second end wall 36, which is located at the opposite end of the air filter housing 30, and in opposite relationship to the compartment 31. The second end wall 36 has a generally flat internal surface 56 which is inclined in relation to the plane perpendicular to the axial direction of the air filter housing 30. The air filter housing 30 is thus adapted to receive the air filter element 5 in such a way that the generally flat internal surfaces 33 and 56, respectively, of the air filter housing 30 is correspondingly shaped and inclined to the generally flat external surface 21 and 25, respectively of the air filter element 5. This is true for both the first and second end panels 20, 24 of the air filter element 5 and for the first and second end walls 32, 36 of the air filter housing 30, and particularly for the inclined surfaces and their respective angles to the plane which is perpendicular to the axial direction I of the air filter element 5.

The fluid inlet 100 is located in the curved outer periphery, or in other words, in the envelope surface of the air filter housing 30. The fluid inlet 100 is furthermore slightly inclined in relation to a normal to the outer periphery. The inclination may either be in the opposite direction, or generally perpendicular to the axial direction of the air filter housing 30.

When the air filter element 5 is installed in its operational position (not depicted in such a state in the FIGS. but is achieved through a translation shown by the large arrows), the opening 22 of the air filter element 5 will match the corresponding opening 35 of the filter housing 30. Further, when in use, the air to be filtered enters the air filter housing 30 through the fluid inlet 100, spreads around the outside of the air filter element 5 within the air filter housing 30, penetrates through the air filter element 5 and the filter material body 10, such that the air is filtered, and finally the filtered, and preferably generally cleaned air, leaves the filter housing 30 through the opening 35 and the fluid outlet 200.

When the air filter element 5 is installed in the air filter housing 30, the inclined surfaces 21, 25 of the air filter element 5 and the inclined surfaces 33, 56 of the air filter housing 30 will provide for a wedging of the air filter element 5, which has the positive effects of contributing to maintaining the air filter element 5 in the desired operational position, as well as at least improving a sealing engagement between the air filter element 5 and the air filter housing 30. Furthermore, the concept of correspondingly inclined surfaces 21, 25 enables for a simple and easy way of inserting the air filter element 5 in a direction which is perpendicular to the axial direction I of the air filter element 5, and the inclined surfaces 21, 25 provide for a natural guidance as to how the air filter element 5 fits into the air filter housing 30. It also gives tactile feedback to the operator or the person in the workshop mounting the air filter element 5, such that visibility may be less important than for known filters for proper assembly.

The air filter housing 30 also comprises a housing lid 34 for closing the compartment 31. The housing lid 34 is arranged in an envelope surface of the air filter housing 30, such that it forms a part of the air filter housing 30 when closed. The closed position is not shown in FIG. 3, but this arrangement, i.e. opening the housing lid 34 in a direction perpendicular to the axial direction of the filter housing 30, has the positive effect of saving space in the engine room or other space in which the air filter system 40 is used. The housing lid 34 is locked in the closed position using two spread apart locking clips. The housing lid 34 is also surrounded by a (not shown) seal for proper sealing of the air filter housing 30. As can be seen in FIG. 3 the housing lid 34 is arranged to lay the air filter housing 30 open for a movement of the air filter element 5 to and from, respectively, the air filter housing 30 also in the direction perpendicular to the axial direction of the air filter housing 30. As is depicted in FIG. 3 the housing lid 34 has an extension in the axial direction of the air filter housing 30, and is at least as long as the extension of the air filter element 5 in its axial direction I. It can also in an alternative embodiment be somewhat longer.

As can be seen in FIGS. 3 and 4, the housing lid 34 has in each axial end an abutment surface 41 and 42, which are arranged to provide pressure on the air filter element 5 when it is installed in the compartment 31, for generating sealing force between the opening 22 of the air filter element 5 and the opening 35 of the air filter housing 30, when the housing lid 34 is arranged to close the air filter housing 30. The abutment surfaces 41, 42 are particularly arranged to provide pressure on the respective first and second ends 20, 24 of the air filter element 5. This arrangement will keep the air filter element 5 retained in the desired position, while at the same time providing a desired spacing between the housing lid 34 and the long side of the air filter element 5 which faces the housing lid 34.

It should be noted that the air filter housing 30 may have many other designs and still maintain the function in relation to the air filter element 5. The locations of the fluid inlet 100 and fluid outlet 200 may be on other parts of the filter housing 30, the direction of fluid flow may be opposite, the size of the air filter housing 30 in relation to the air filter element 5 may be different etc.

With reference to FIGS. 2a, 2b, 3 and 4 the inclination of the end panels and corresponding surfaces in relation to the plane perpendicular to the axial direction of the air filter element and of the air filter housing 30 corresponds to an angle α for the first end panel 20 and for the first end wall 32, and to an angle β for the second end panel 24 and for the second end wall 56. Theses angles may range from 1° to 10°, or from 1° to 5°, or from 1° to 3° in order to provide the desired wedging and sealing effects.

In this first embodiment the angle β for the second end panel 24 is equal to the angle α for the first end panel 20. Thus in FIGS. 2a, 2b, 3 and 4 an embodiment is depicted which represents an air filter element 5 for which substantially the complete part of the first end panel 20 and of the second end panel 24, respectively, has such an external shape that the air filter element 5, as seen from a side view, forms a wedge structure 5.

It should be noted in connection with the air filter housing 30 that in the embodiments depicted herein the inclination of the inclined surface 33 is equal to the inclination of the first end wall 32, and the inclination of the inclined surface 56 is equal to the inclination of the second end wall 36 for sake of simplicity. This may however be designed differently, such that the outer shape of the air filter housing 30 does not conform to the inner shape of the compartment 31.

The first end panel 20 and the second end panel 24 of the air filter element 5 is provided with a guiding structure 27 for engagement with corresponding guiding structures 28 provided on inner surfaces of the air filter housing 30. These guiding structures are made of compressible material, such as a rubber, foam rubber or polyurethane. This arrangement provides for the air filter element 5 to be additionally guided to its operational position in the air filter housing 30 during assembly and during use, and enables a simple and easy way to ensure a correct insertion of the air filter element 5 which may enable a desired sealing around the opening 22 of the air filter element 5 against the air filter housing 30. Furthermore, it provides a rotational restriction of the air filter element 5, thus contributes to retaining the air filter element 5 in its desired operational position which is enabling a desired sealing. The guiding structure 27 is depicted as having a tapered shape, which partially encompasses the opening 22 of the air filter element 5. Thus, the guiding structure 27 has a guiding direction, in which the guiding direction coincides with the direction of inclination of the inclined surface of the associated end panel.

Figure 5A:
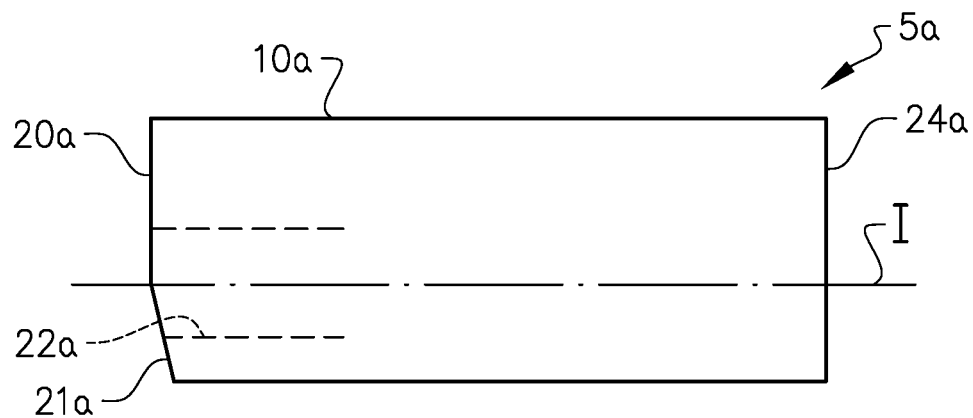
FIG. 5a is a schematical side view of a second embodiment of a filter element.
Figure 5B:
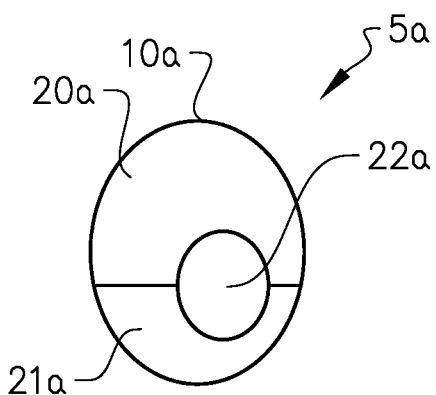
FIG. 5b is a schematical end view of the filter element in FIG. 5b.

Turning now to FIGS. 5a and 5b, they disclose a second embodiment of a filter element 5a. This embodiment may, as for the first embodiment, be used as an air filter element 5, but also for the filtration of other fluids, or in relation to other than automotive use. Features of the second embodiment which are generally similar to the first embodiment already disclosed are not further discussed.

FIG. 5a discloses a filter element 5a in side view. The filter element 5a has a first end panel 20a and a second end panel 24a. The first end panel 20a comprises a generally flat external surface 21a, which is inclined in relation to a plane perpendicular to the axial direction I of the filter element 5a. In FIGS. 5a and 5b the flat external surface 21a partially encompasses the opening 22a, but only comprises a vertically seen, lower part of the filter element 5a. In the depicted embodiment the transition from the external surface 21a to the remainder of the first end panel 20a is generally straight and horizontal, which is seen in FIG. 5b, but this may be designed otherwise. The external surface 21a should be positioned on the part of the filter element 5a which is adapted to be directed towards the filter housing 30a when being mounted therein. The size of the external surface 21a in relation to the first end panel 20a may also be of different magnitude, such that either more or less of the first end panel 20a is made inclined.

It should be noted that the filter element 5a in this embodiment is provided with an uneven thickness between its outer envelope surface and its interior, such that different parts of i.a. the filter material body 10a have smoothly altering thickness along an outer periphery of the filter element 5a. The thickness of the filter element 5a may however also have a step-wise altering design. The filter element 5a may also have other than flat outer envelope surfaces, such as a corrugated or pleated surface, or a surface having peaks and valleys. The filter element 5a may further have a cross-section of either continuous or discontinuous material types. It may for example be provided with an outer coating or be covered by an outer and/or inner layer.

In the depicted embodiment the tubular filter material body 10a has an oval shape. The tubular filter material body 10a may alternatively be for example circular, elliptic or flower-shaped. Furthermore the opening 22a is in the embodiment depicted eccentrically in relation to the centre of the filter element 5a in an axial direction I.

Figure 6:
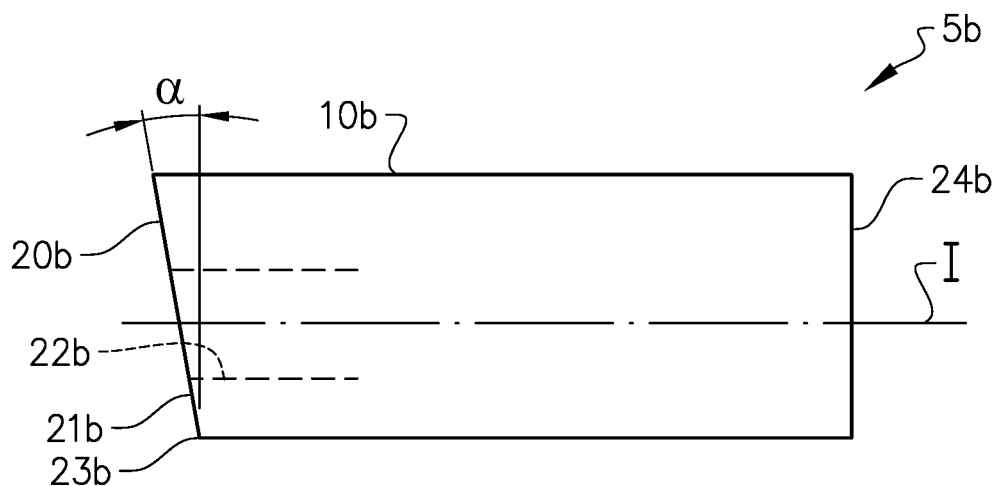
FIG. 6 is a schematical side view of a third embodiment of a filter element.

The external inclined surface 21a of the filter element 5a is depicted as partially encompassing the opening 22a. It may also fully encompass the first end panel 20a, as depicted in FIG. 6, which discloses a third embodiment of the filter element 5b. The periphery 23b of the first end panel 20b in the axial direction I defines a plane, which is inclined in relation to a plane perpendicular to the axial direction of the filter element 5b. Thus, it depicts an embodiment in which the generally flat external surface 21b encompasses substantially the complete first end panel 20b, and thus also the opening 22b. This provides for an improved sealing engagement around the opening of the filter element against the filter housing 30b. The third embodiment is in all other respects similar to the second embodiment. It is noted in this regard that the second end panel 24a, 24b in both of the second and third embodiments is parallel with the plane perpendicular to the axial direction I of the filter element 5a, 5b.

Alternatively to such a design of the second end panel 24a, 24b it may be given an inclination to the plane perpendicular to the axial direction I of the filter element 5a, 5b. The flat external surface of the second end panel 24a, 24b in FIGS. 5a and 6 may e.g. be given an inclination of similar magnitude and position as for the respective external surface 21a, 21b of the first end panel 20a, 20b. It may thus partially or fully encompass the second end panel 24a, 24b. It should however comprise the vertically seen, lower part of the filter element 5a, 5b. A transition from the inclined external surface to the remainder of the second end panel 21a, 21b may be generally straight and horizontal, but this may be designed otherwise. The inclined external surface should be positioned on the part of the filter element 5a, 5b which is adapted to be directed towards the filter housing 30a, 30b when being mounted therein. The size of the inclined external surface in relation to the second end panel 21a, 21b may also be of different magnitude, such that either more or less of the second end panel 21a, 21b is made inclined. The inclination may naturally also be of other magnitude at the second end panel 21a, 21b than at the first end panel 20a, 20b.

Figure 7:
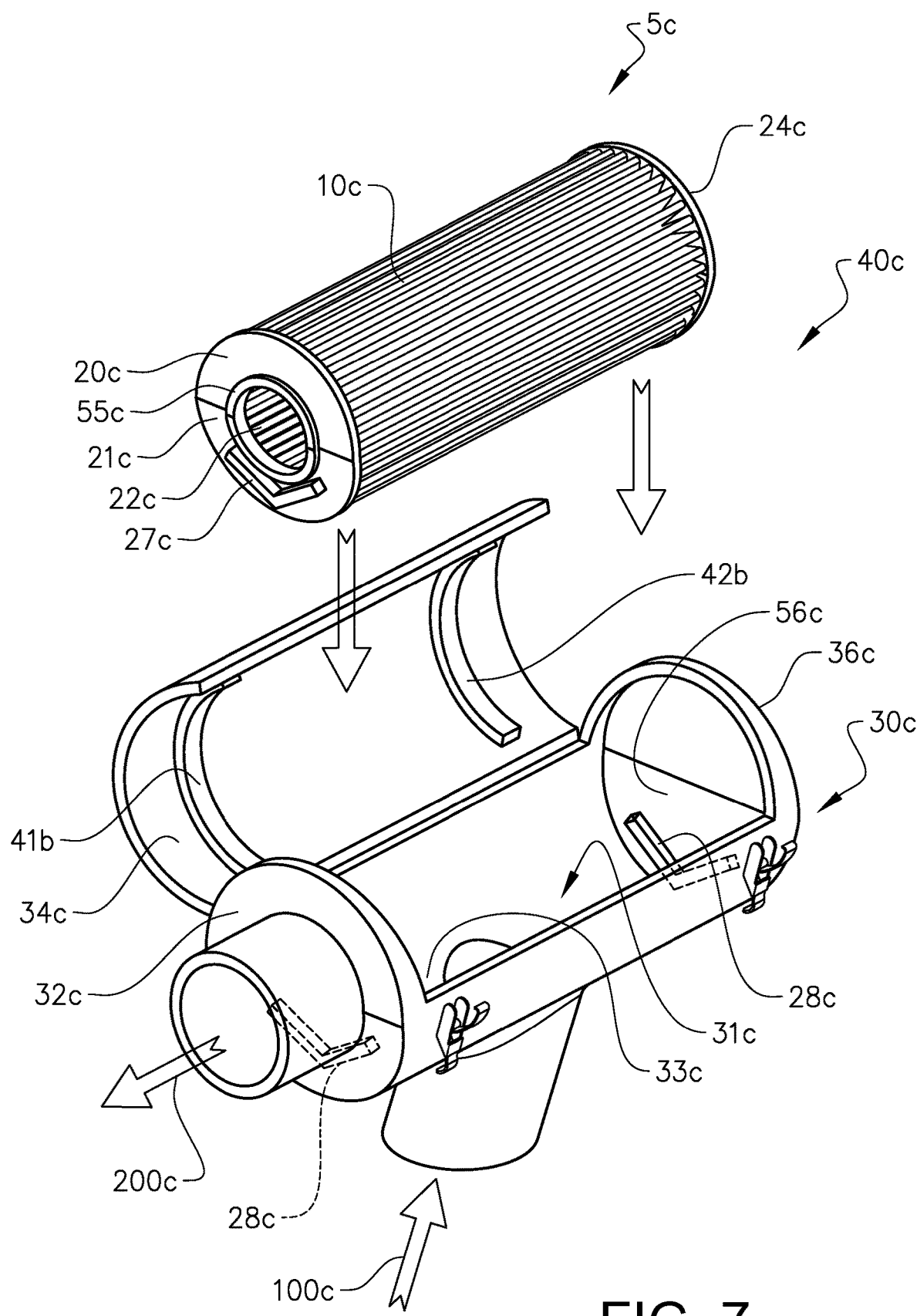
FIG. 7 is a perspective view of an alternative embodiment of a filter housing together with a forth embodiment of the filter element.

A fourth embodiment of the filter element 5c is disclosed in FIG. 7 together with a complimentary shaped alternative embodiment of a filter housing 30c. The filter element 5c and the filter housing 30c form a filter system 40c. Features of the fourth embodiment which are generally similar to corresponding features of the first embodiment already disclosed are not further discussed. The filter element 5c in this embodiment is having a circular cylindrical shape with a centrally located opening 22c for mating with a centrally located air outlet 200c in the filter housing 30c. The filter element 5c has a filter material body 10c made of pleated paper. The major difference between this embodiment of the filter element 5c and filter housing 30c in relation to the embodiment disclosed in FIGS. 3 and 4 is that the first end panel 20c and the second end panel 24 c are both provided with an inclined external surface which are inclined in, relation to the plane perpendicular to the axial direction of the filter element 5c. The inclined external surfaces are mirror images of one another, such that location, size and magnitude are similar, except for the directions of inclination which are opposite. In order to accommodate such a filter element 5c, the filter housing 30c has generally flat internal surfaces in the compartment 31c on both of the first and second end walls 32c, 36c. The location, size and magnitude of the inclination of the generally flat internal surfaces are similar, except for the directions of inclination which are opposite one another. The inclination of the generally flat internal surfaces of the filter housing 30c is generally similar to the inclination of the inclined external surfaces of the filter element 30c.

As best seen in FIGS. 2a and 2b, the first end panel 20 and the second end panel 24 of the air filter element 5 in any one of the herein described embodiments may comprise additional means 55 for a sealing engagement with the opening 35 of the filter housing 30 and against air by-passing the filter material body 10 directly into the interior of the air filter element 5. In a further additional embodiment this sealing means is formed integral with the external inclined surfaces 21, 25 of the first end panel 20 and the second end panel 24. This provides for an improved sealing around the opening 22 of the filter element 5 against the filter housing 30.

The guiding structure 27 may substantially encompass the opening 22, and it may thus be combined into one structure with the additional means 55 for a sealing engagement.

It should be noted that in all of the depicted embodiments of the filter element 5, 5a, 5b, 5c which have a first and/or second end panel 20, 20a, 20b, 20c, 24, 24a, 24b, 24c which is not fully covered by an inclined external surface, the remaining parts of the first and/or second end panel 20, 20a, 20b, 20c, 24, 24a, 24b, 24c do not need to be parallel to the plane perpendicular to the axial direction I of the filter element 5, 5a, 5b, 5c. These remaining parts may be either stepwise inclined, be curved, be stepwise curved or any combination of these shapes.

The filter element 5, 5b, 5c may also be designed without a seal 52, but if such a seal 52 is present, it may be given any size and shape found advantageous.

The guiding structures 27 on the filter element 5, 5a, 5b, 5c and the guiding structures 28 on the filter housing 30, 30a, 30b, 30c may be left out completely, or be located on only one side thereof.

The alternative embodiments which have been disclosed above may be combined in any way which is found advantageous, unless anything else is explicitly stated, as long as the features of the main claims are fulfilled.

It is to be understood that the present invention is not limited to the embodiments described above and illustrated in the drawings; rather, the skilled person will recognize that many changes and modifications may be made within the scope of the appended claims.

The invention claimed is:

1. A filter element for being removably arranged in a filter housing, wherein the filter element comprises:
   a tubular filter material body, and
   a first end panel at a first end of the filter element in an axial direction of the filter element,
   the first end panel comprising an opening to an interior of the filter material body,
   wherein the first end panel comprises a generally flat external surface, which is inclined in relation to a plane perpendicular to the axial direction of the filter element,
   wherein the filter element comprises a second end panel opposite the first end panel in the axial direction, wherein the second end panel comprises a generally flat external surface, which is inclined in relation to the plane perpendicular to the axial direction of the filter element, and
   wherein the external surface of the second end panel is oppositely inclined as seen in relation to the external surface of the first end panel, wherein the first end panel and/or the second end panel is provided with a guiding structure for engagement with an inner surface of the filter housing for guiding the filter element to an operational position in the filter housing during insertion of the filter element into the filter housing, wherein the guiding structure has a guiding direction, the guiding direction coinciding with a direction of inclination of the inclined surface of the associated end panel.

2. The filter element according to claim 1, wherein a periphery of the first end panel in the axial direction defines a plane, which is inclined in relation to the plane perpendicular to the axial direction of the filter element, and, wherein the inclination in relation to the plane perpendicular to the axial direction of the filter element corresponds to an angle ($\alpha$) of 1° to 10°, and wherein a periphery of the second end panel in the axial direction defines a plane, which is inclined in relation to the plane perpendicular to the axial direction of the filter element, and wherein the inclination in relation to the plane perpendicular to the axial direction of the filter element corresponds to an angle ($\beta$) for the second end panel of 1° to 10°.

3. The filter element according to claim 1, wherein the flat external surface substantially encompasses the opening.

4. The filter element according to claim 1, wherein the opening is located coaxial to the filter element.

5. The filter element according to claim 2, wherein the angle (β) for the second end panel is equal to the angle (α) for the first end panel.

6. The filter element according to claim 1, wherein the guiding structure forms a tapered shape.

7. The filter element according to claim 1, wherein the guiding structure is provided on the first end panel and partially or substantially encompasses the opening.

8. The filter element according to claim 1, wherein the guiding structure of the first end panel and/or the second end panel is located coaxial to the filter element.

9. The filter element according to claim 1, wherein the first end panel and/or the second end panel is provided with a compressible material.

10. The filter element according to claim 1, wherein the first end panel and/or the second end panel comprising the guiding structure is made of a compressible material.

11. The filter element according to claim 9, wherein the compressible material is a rubber.

12. The filter element according to claim 1, wherein the first end panel and/or the second end panel comprises a sealing engagement with an inner surface of the filter housing.

13. The filter element according to claim 12, wherein the sealing engagement is formed integral with the external inclined surface of the first end panel and/or the second end panel.

14. The filter element according to claim 1, wherein the external inclined surface of the first end panel and/or the second end panel is adapted for engaging a correspondingly inclined internal surface of the filter housing.

15. The filter element according to claim 1, wherein the filter material body is made of a material chosen from the group of: paper and cellulose.

16. The filter element according to claim 1, wherein the filter element has a tubular shape, chosen from the group of: circular, elliptic, oval and flower-shaped.

17. The filter element according to claim 1, wherein the filter element is adapted for cleaning a fluid for an internal combustion engine.

18. The filter element according to claim 1, wherein the filter element is adapted for cleaning air.

19. A filter housing comprising a compartment for receiving a filter element, the filter housing comprising:
a first end wall in an axial direction of the filter housing and a second end wall located at an opposite end of the air filter housing and in opposite relationship to the compartment,
the first end wall comprising an opening to the compartment wherein the first end wall comprises a generally flat internal surface, which is inclined in relation to a plane perpendicular to the axial direction of the filter housing, and the second end wall comprises a generally flat internal surface, which is inclined in relation to the plane perpendicular to the axial direction of the filter housing,
wherein the filter housing comprises a filter element in the compartment, the filter element comprising:
a tubular filter material body, and
a first end panel at a first end of the filter element in an axial direction of the filter element,
the first end panel comprising an opening to an interior of the filter material body,
wherein the first end panel comprises a generally flat external surface, which is inclined in relation to the plane perpendicular to the axial direction of the filter element,
wherein the filter element comprises a second end panel opposite the first end panel in the axial direction, wherein the second end panel comprises a generally flat external surface, which is inclined in relation to the plane perpendicular to the axial direction of the filter element, and
wherein the external surface of the second end panel is oppositely inclined as seen in relation to the external surface of the first end panel, wherein the first end panel and/or the second end panel is provided with a guiding structure for engagement with an inner surface of the filter housing for guiding the filter element to an operational position in the filter housing during insertion of the filter element into the filter housing, wherein the guiding structure has a guiding direction, the guiding direction coinciding with a direction of inclination of the inclined surface of the associated end panel, and
wherein the generally flat internal surface of the first end wall and the generally flat internal surface of the second end wall of the filter housing are correspondingly shaped to the generally flat external surface of the first end panel and the generally flat external surface of the second end panel of the filter element.

20. The filter housing according to claim 19, the filter housing comprising a housing lid for closing the compartment, wherein the housing lid has an abutment surface which is arranged to provide pressure on a filter element positioned in the compartment for generating a sealing force between an opening of the filter element and an opening of the filter housing when the housing lid is arranged to close the filter housing.

21. The filter housing according to claim 20, wherein the housing lid is arranged in an envelope surface of the filter housing, such that the housing lid forms a part of the filter housing when closed, and wherein the housing lid is arranged to open the filter housing for a movement of the filter element to and from, respectively, the filter housing in a direction perpendicular to the axial direction of the filter housing.

22. The filter housing according to claim 20, wherein the housing lid has an extension in the axial direction of the filter housing, which is as long as an extension of the filter element in its axial direction, or somewhat longer for a movement of the filter element to and from, respectively, the filter housing in a position, in which its axial direction is generally in parallel with the axial direction of the filter housing.

23. A filter system comprising a filter housing comprising:
a first end wall in an axial direction of the filter housing and a second end wall located at an opposite end of the air filter housing and in opposite relationship to the compartment,
the first end wall comprising an opening to the compartment wherein the first end wall comprises a generally flat internal surface, which is inclined in relation to a plane perpendicular to the axial direction of the filter housing, and the second end wall comprises a generally flat internal surface, which is inclined in relation to the plane perpendicular to the axial direction of the filter housing,
wherein the filter housing comprises a filter element in the compartment, the filter element comprising:
a tubular filter material body, and
a first end panel at a first end of the filter element in an axial direction of the filter element, the first end panel comprising an opening to an interior of the filter material body, wherein the first end panel comprises a generally flat external surface, which is inclined in relation to the plane perpendicular to the axial direction of the filter element, wherein the filter element comprises a second end panel opposite the first end panel in the axial direction, wherein the second end panel comprises a generally flat external surface, which is inclined in relation to the plane perpendicular to the axial direction of the filter element, and wherein the external surface of the second end panel is oppositely inclined as seen in relation to the external surface of the first end panel, wherein the first end panel and/or the second end panel is provided with a guiding structure for engagement with an inner surface of the filter housing for guiding the filter element to an operational position in the filter housing during insertion of the filter element into the filter housing, wherein the guiding structure has a guiding direction, the guiding direction coinciding with a direction of inclination of the inclined surface of the associated end panel, wherein the generally flat internal surface of the first end wall and the generally flat internal surface of the second end wall of the filter housing are correspondingly shaped to the generally flat external surface of the first end panel and the generally flat external surface of the second end panel of the filter element, and wherein the external inclined surface of the first end panel of the filter element is retained against the internal inclined surface of the first end wall of the filter housing when the filter element is installed in the filter housing.

24. An internal combustion engine comprising a filter system according to claim 23.

25. A vehicle comprising the internal combustion engine according to claim 24.

* * * * *